(12) United States Patent
Chen et al.

(10) Patent No.: US 8,238,719 B2
(45) Date of Patent: Aug. 7, 2012

(54) METHOD FOR PROCESSING A SPORTS VIDEO AND APPARATUS THEREOF

(75) Inventors: Ming-Jun Chen, Tai-Nan (TW); Ho-Chao Huang, Taipei (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 1454 days.

(21) Appl. No.: 11/745,462

(22) Filed: May 8, 2007

(65) Prior Publication Data
US 2008/0282287 A1    Nov. 13, 2008

(51) Int. Cl.
*H04N 5/93* (2006.01)
*G11B 27/00* (2006.01)
*G11B 7/086* (2006.01)
*G11B 21/08* (2006.01)
*G11B 5/09* (2006.01)
*G11B 15/52* (2006.01)
*G11B 19/02* (2006.01)
*G11B 20/10* (2006.01)
*G11B 27/02* (2006.01)

(52) U.S. Cl. .......................................... 386/278

(58) Field of Classification Search .......... 386/278, 386/280, 281, 282, 285; 369/30.05, 30.19, 369/47.13, 83
See application file for complete search history.

(56) References Cited

U.S. PATENT DOCUMENTS

| | | | | |
|---|---|---|---|---|
| 6,449,422 | B1 * | 9/2002 | Ebisawa | 386/241 |
| 6,931,595 | B2 | 8/2005 | Pan et al. | |
| 7,028,325 | B1 * | 4/2006 | Rui et al. | 725/37 |
| 7,424,204 | B2 * | 9/2008 | Nakamura | 386/248 |
| 7,483,624 | B2 * | 1/2009 | Zhang | 386/241 |
| 2004/0255249 | A1 * | 12/2004 | Chang et al. | 715/723 |

FOREIGN PATENT DOCUMENTS
CN    1382288 A    11/2002
CN    1836287 A    9/2006

* cited by examiner

*Primary Examiner* — Daquan Zhao
(74) *Attorney, Agent, or Firm* — Winston Hsu; Scott Margo

(57) ABSTRACT

The present invention discloses a method of processing a sports video. The method includes the steps of: analyzing the sports video to detect at least one semantic event and each of the at least one semantic event associated with a segment length; and generating a summarized video according to the detected at least one semantic event.

30 Claims, 5 Drawing Sheets

METHOD FOR PROCESSING A SPORTS VIDEO AND APPARATUS THEREOF

BACKGROUND OF THE INVENTION

1. Field of the Invention

The present invention relates to a method for processing a sports video and apparatus thereof, and more particularly, to a method for summarizing the sports video through adaptively assigning a segment length of an event in the sports video.

2. Description of the Prior Art

With rapid development in digital television systems, video entertainment products have become essential in daily life, therefore more and more entertainment videos are being generated. However, sometimes different types of video content may take longer for viewers to fully enjoy it. For example, a baseball game normally takes at least two hours or even longer. The baseball game video content has a plurality of events performed by two baseball teams. A viewer may only want to enjoy some of the desired events from the whole baseball game video, instead of viewing the entire game. Therefore, in order to meet user requirements in this capacity, some tools have been developed for processing baseball game videos to generate a summarized video version.

According to the prior art, one of the conventional methods is to directly detect events that are important for the baseball game video according to a predetermined definition of an event. The event may represent an exciting event during the baseball game. For example, the event may be a one-base hit, two-base hit, three-base hit, home run hit, base on ball, fielding, and go ahead run, etc, during the base ball game. In prior art, only a predetermined time interval will be assigned to each of the video segment that corresponds to the event categorization, which are the one-base hit, two-base hit, three-base hit, home run hit, base on ball, fielding, and go ahead run. For brevity, the following conventional method only extracts the video segment corresponding to the home run scene. According to prior art, the time interval assigned to the video segment corresponding to the home run scene is a fixed time interval. In other words, whenever a home run scene is detected by the conventional method, the extracted video segment of the home run scene is of a fixed length, even if the home run scene may be unusually long. Also, the prior art method ignores potentially exciting actions that may have occurred immediately before the home run. For example, if a batter hits a home run, then the viewer may want to enjoy the entire home run, including some of the batter movements prior to the home run. For example, some of the viewers may enjoy seeing the batter warming up and doing practice swings prior to the home run. However, the conventional method only extracts the home run scene where the batter contacts the ball and runs toward the home base afterwards. Then, the summarized video version is generated through the conventional method, in which all of the exciting scenes in the baseball game are corresponding to the predetermined time interval. Furthermore, according to the prior art, another conventional method is just to set the exciting scenes by an average time interval, in which the average time interval is obtained by divided the total length of the summarized video by the total number of the exciting scenes. Similar to the first conventional method, all of the exciting scenes are also corresponding to the same time interval. Therefore, the prior art summarizing tools may not satisfy all viewers.

U.S. Pat. No. 6,931,595 discloses a method for automatic extraction of semantically significant events from a video. In this prior art invention, the method determines the boundary of a slow motion replay for an event in a video, which includes determining a statistical measure of different portions of the video. The video may include the event and the slow motion replay of the event. This method utilizes the statistical measure to determine the boundary of the slow motion replay of the event. Accordingly, when the boundary of the slow motion replays of the event are detected, they may be used as representative of semantically important events of the video and subsequent summarization of the video content.

U.S. Pat. No. 7,028,325 discloses a method for annotating programs for automatic summary generation. According to this prior art, audio/video programming content is made available to a receiver from a content provider, and a meta data is made available to the receiver from a meta data provider. The meta data corresponds to the programming content, and identifies, for each of multiple portions of the programming content, an indicator of a likelihood that the portion is an exciting portion of the content. In one implementation of this prior art, the meta data includes probabilities that segments of a baseball program are exciting, and is generated by analyzing the audio data of the baseball program for both heightened speech and baseball hits. The meta data can then be used to generate a summary for the baseball program.

SUMMARY OF THE INVENTION

Therefore, one of the objectives of the present invention is to summarize a sports video by adaptively assigning a segment length of an event in the sports video.

According to an embodiment of the present invention, a method of processing a sports video is disclosed. The method comprises the following steps: analyzing the sports video to detect at least one semantic event and each of the at least one semantic event associated with a segment length; and generating a summarized video according to the detected at least one semantic event.

According to a second embodiment of the present invention, a method of processing a baseball game video is disclosed. The method comprises the steps of: detecting a score board region of the baseball game video; identifying at least one text content in the score board region; generating at least one semantic event according to the text content in the score board region; and analyzing variation of the text content throughout the baseball game video to determine a segment length of the semantic event.

According to a third embodiment of the present invention, a processing apparatus for processing a sports video is disclosed. The processing apparatus comprises an analyzing block, and a first processing block. The analyzing block analyzes the sports video to detect at least one semantic event and each of the at least one semantic event associated with a segment length; and the first processing block coupled to the analyzing device for generating a summarized video according to the detected at least one semantic event.

According to a fourth embodiment of the present invention, a processing apparatus for processing a baseball game video is disclosed. The processing apparatus comprises a first detecting block, a second detecting block, a first processing block, and a second processing block. The first detecting block detects a score board region of the baseball game video; the second detecting block coupled to the first detecting block for identifying at least one text content in the score board region; the first processing block coupled to the second detecting block for generating at least one semantic event according to the text content in the score board region; and the second processing block coupled to the first processing block for analyzing variation of the text content throughout the baseball game video to determine a segment length of the semantic event.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
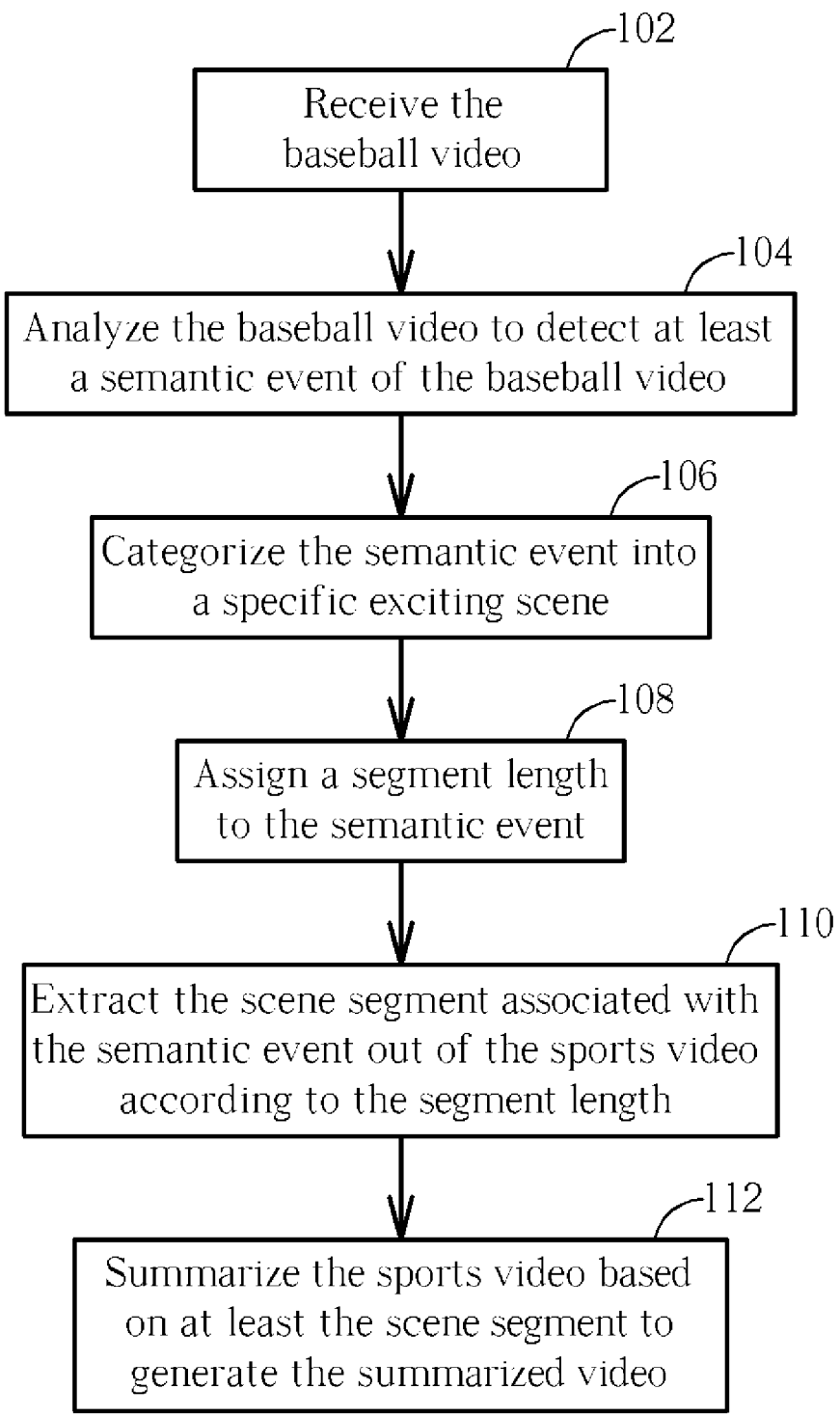
FIG. 1 is a flow chart illustrating a method of processing a sports video according to an embodiment of the present invention.

Please refer to FIG. 1. FIG. 1 is a flow chart illustrating a method of processing a sports video according to an embodiment of the present invention. The method is utilized for summarizing a video of a sports competition to generate a corresponding summarized video version. Furthermore, in order to describe the spirit of the present invention more clearly, the sports competition is explained in terms of a baseball game in the following description. However, this is not meant to be the limitation of the present invention. In other words, other types of sports competitions, such as football games and basketball games, are also within the scope of the present invention. Furthermore, in this embodiment, the baseball video utilized for generating the summarized video version is a recorded video, however, this again is not meant to be the limitation of the present invention. Those skilled in this art can easily modify the method of the present invention to conform to the situation of a live sports program broadcasting. The method is briefly described as below:

Step 102: Receive the baseball video;

Step 104: Analyze the baseball video to detect at least a semantic event of the baseball video, wherein the semantic event corresponds to an exciting scene of the baseball video;

Step 106: Categorize the semantic event into a specific exciting scene;

Step 108: Assign a segment length to the semantic event;

Step 110: Extract a scene segment associated with the semantic event out of the sports video according to the segment length; and Step 112: Summarize the sports video based on at least the scene segment to generate the summarized video.

Figure 2:
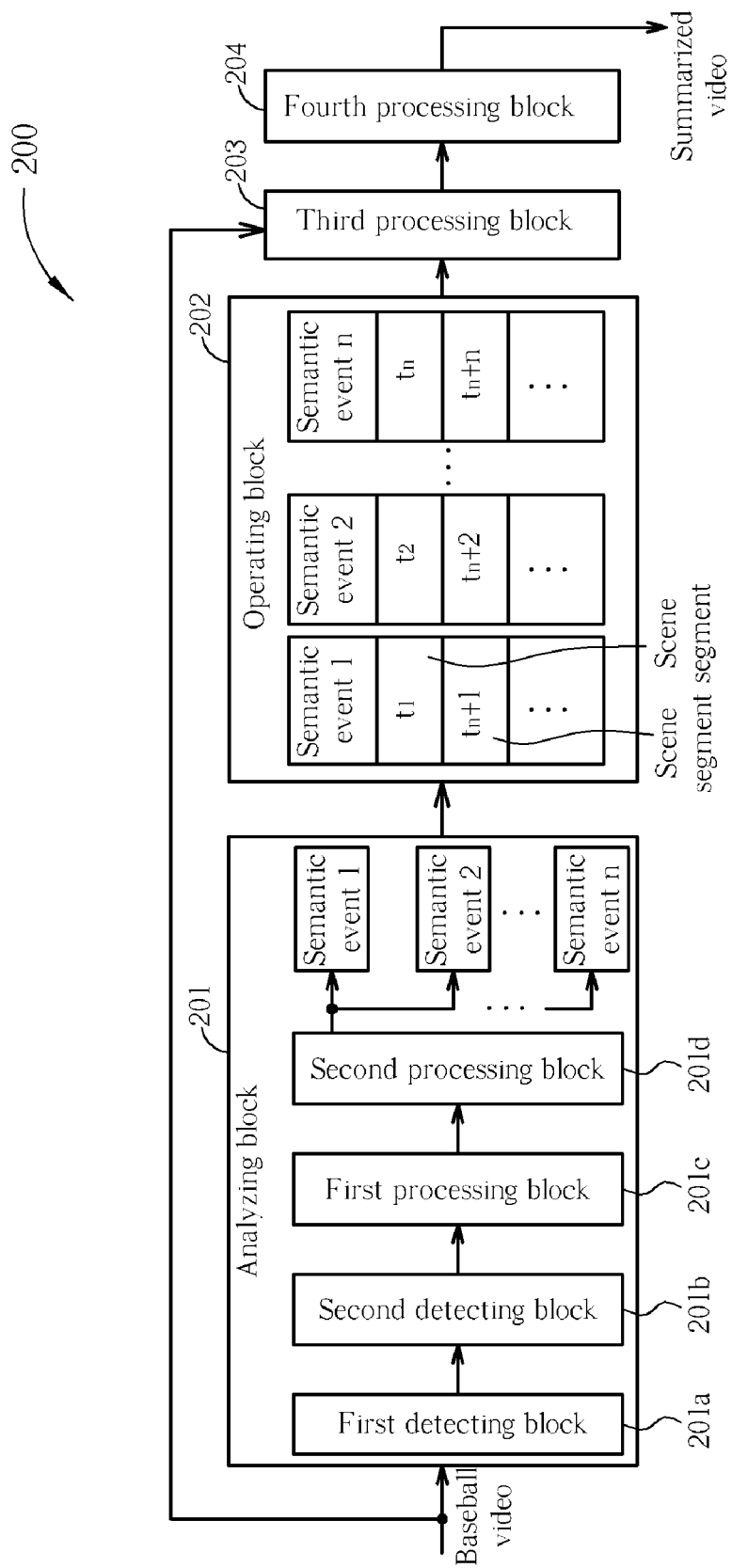
FIG. 2 is a diagram illustrating an apparatus for processing the sports video according to an embodiment of the present invention.

Provided that substantially the same result is achieved, the steps of the flowchart shown in FIG. 1 need not be in the exact order shown and need not be contiguous. Please refer to FIG. 2. FIG. 2 is a diagram illustrating an apparatus 200 for processing the sports video according to an embodiment of the present invention. For brevity, the apparatus 200 is utilized for processing the above-mentioned baseball video, and utilizes the aforementioned method shown in FIG. 1 to summarize the baseball video to thereby generate the summarized video version. The summarizing apparatus 200 comprises an analyzing block 201, an operating block 202, a third processing block 203, and a fourth processing block 204. The analyzing block 201 comprises a first detecting block 201a, a second detecting block 201b, a first processing block 201c, and a second processing block 201d. The first detecting block 201a detects a scoreboard region of the baseball game video. The second detecting block 201b coupled to the first detecting block 201a for identifying at least one text content in the score board region. The first processing block 201c coupled to the second detecting block 201b for generating at least one semantic event according to the text content in the score board region. The second processing block 201d coupled to the first processing block 201c for analyzing variation of the text content throughout the baseball game video to determine a segment length of the semantic event. Please refer to FIG. 1 in conjunction with FIG. 2. In step 102, when the analyzing block 201 receives the baseball video, the first processing block 201c of the analyzing block 201 analyzes the baseball video to detect at least a semantic event of the baseball video, wherein the semantic event corresponds to an exciting scene of the baseball video. As known by baseball fans, there are a lot of exciting scenes that might occur during a baseball game, such as a home run hit, a double play, a triple, catching a pop fly, etc. Therefore, semantic events found in the baseball video represent exciting scenes (e.g., the first semantic event represents hitting a home run, and the second semantic event represents double play). The first processing block 201c detects all of the semantic events that occurred in the baseball video, and then categorizes the semantic events into corresponding exciting scenes respectively.

In step 104, the first detecting block 201a of the analyzing block 201 first finds out the score board region (also known as a score box or box score) of the baseball video, in which the score board region is usually in a static region of the baseball video. Then, the second detecting block 201b of the analyzing block 201 identifies the text contents in the score board, in which the text contents can be the outs, scores, and innings of the baseball game. As known by baseball fans, all of the events that occurred within the baseball game and occurring times can be found according to the variation between the outs, scores, and innings. Furthermore, the semantic event that corresponds to the event can also be determined according to the variation between the outs, scores, and innings around the corresponding occurring time (step 106). Please note that, the second processing block 201d of the present invention is not limited to only analyzing the variation between the outs, scores, and innings for detecting the events. In other embodiments of the present invention, the second processing block 201d also can analyze the audio data of the baseball video to determine the time when the voice of the sports broadcaster or commentator is increased to a higher pitch to detect an excitement level of the events. Furthermore, in other embodiment of the present invention, the second processing block 201d analyzes a specific term by a sports broadcaster or commentator in the sports video.

Figure 3:
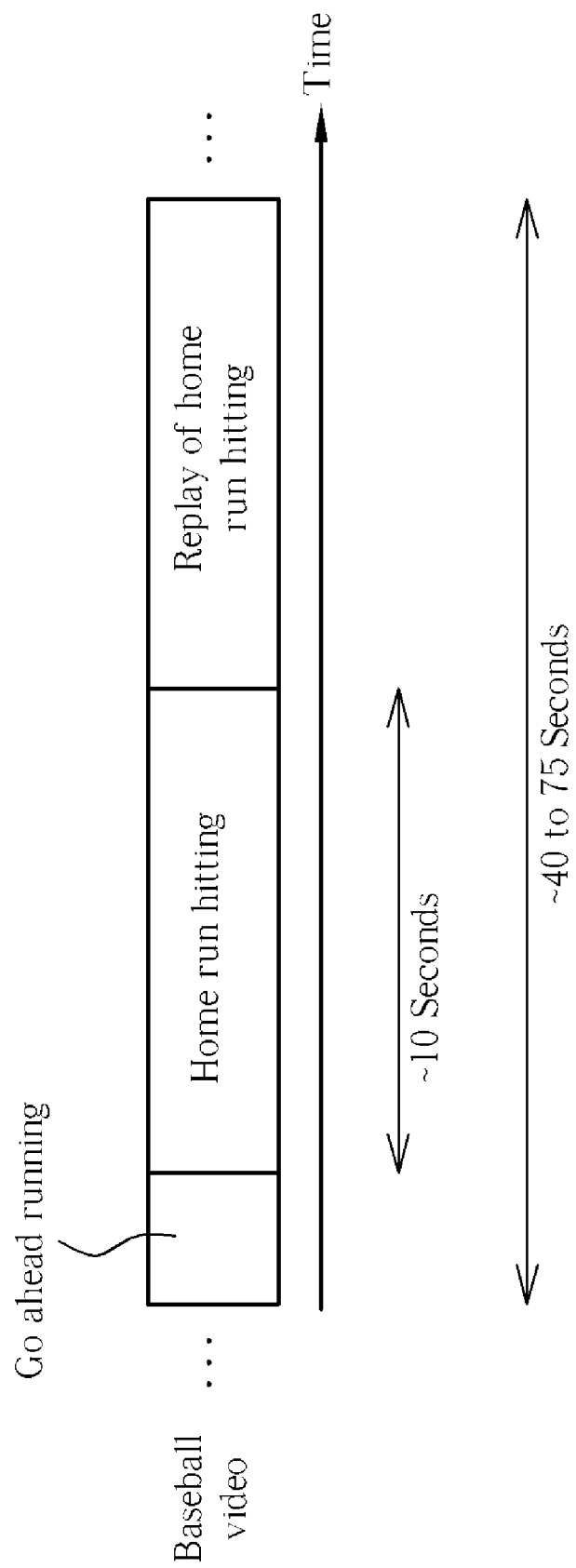
FIG. 3 is a timing diagram illustrating the situation where the home run hit occurs together with a go ahead run in a baseball game.

In step 108, the operating block 202 assigns a segment length to the semantic event according to the importance of the corresponding event. In the example of the baseball game, through analysis of the analyzing block 201, if the home run hit occurs together with a go ahead run situation, then this event is considered more important than just a home run hit. Please refer to FIG. 3. FIG. 3 is a timing diagram illustrating the situation where the home run hit happens together with a go ahead run in a baseball game. In the prior art, only the segment of the home run hit is extracted, which is about 10 seconds. In this embodiment, the operating block 202, however, will assign a segment length between 45-75 seconds to the semantic event, which includes the segment of the go ahead run and the home run hit. On the other hand, if a triple base hit happens together with a go ahead run situation and the high pitch level of a sports broadcaster or commentator, then the operating block 202 will assign a segment length between 35-60 seconds to the semantic event. If the double base hit occurs together with an excellent fielding play, then the operating block 202 will assign a segment length between 25-35 seconds to the semantic event. It is important to note that, the above-mentioned segment lengths are just examples of the embodiment, and not meant to be the limitation of the present invention. In other words, there are many combinations of events can be obtained in the baseball game, and thus the range of the segment length that corresponds to each combination can be set by the designer according to design requirements. Furthermore, the segment length of the semantic event that is assigned by the operating block 202 may also contain the playback video segment of the semantic event, depending upon the requirement of the viewer.

In another embodiment of the operating block 202, a desired length T is inputted to the operating block 202 by the viewer, in which the desired length T is the length of summarized video of the baseball game and decided by the requirement of the viewer. Therefore the segment length of each semantic event is proportionally varies according to the desired length T. In other words, if the desired length T that received by the operating block 202 is more longer, then the segment length of each semantic event can be more longer, and vice versa.

Figure 4:
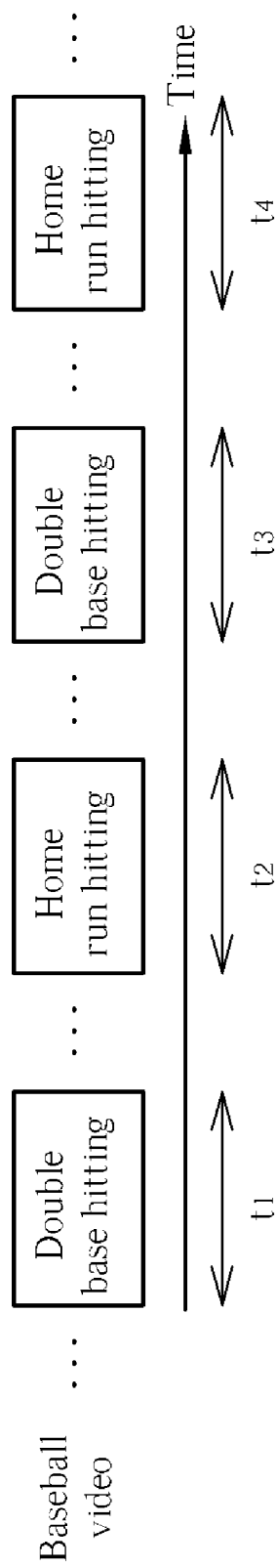
FIG. 4 is a timing diagram illustrating the segment lengths for a home run hit and a double base hit during a baseball game.

After the operating block 202 assigns the segment length to the event that corresponds to the semantic event found by the analyzing block 201, the third processing block 203 extracts a scene segment associated with the semantic event out of the sports video according to the segment length. Therefore, according to the embodiment of the present invention, even the events in the baseball game have the same semantic event, the segment lengths of the events may be different, depending on the importance of that event. Please refer to FIG. 4. FIG. 4 is a timing diagram illustrating the segment lengths of the home run hit (i.e. the time intervals $t_2$, $t_4$) and the double base hit (i.e. the time intervals $t_1$, $t_3$) in the baseball game. The time interval $t_2$ may not equal the time interval $t_4$, and the time interval $t_1$ may not equal the time interval $t_3$. Please note that, in this embodiment, the operating block 202 is properly configured such that the more important the event is, the longer segment length assigned to the event is. Besides importance, event type and weight can also be the factor to decide the length of the semantic event. Also, the relative importance of the semantic event comparing to its prior and subsequent events can be the one of factors. However, this is not meant to be the limitation to the present invention. In other words, other embodiments of the present invention may configure the operating block 202 to set the segment length of an event based on different factors, such as the volume level of the spectators of the baseball game.

Figure 5:
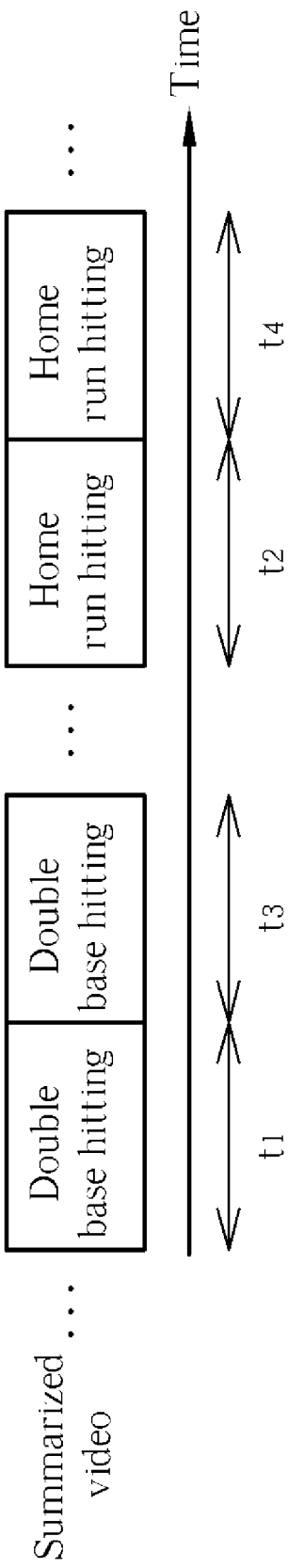
FIG. 5 is a timing diagram illustrating an arrangement of the scene segments of the summarized video according to an embodiment of the present invention.

In step 112, the present invention utilizes the fourth processing block 204 to summarize the sports video based on the scene segments extracted by the preceding third processing block 203 to generate the summarized video. The summarized video contains the events of all of the semantic events in the baseball game. Furthermore, because the scene segment extracted by the third processing block 203 is just a segment of the baseball video, the fourth processing block 204 can therefore randomly arrange the scene segments to generate the summarized video. In other words, the fourth processing block 204 can arrange the scene segments of the same semantic event in the same group. Please refer to FIG. 5. FIG. 5 is a timing diagram illustrating one of the arrangements of the scene segments of the summarized video. For example, as shown in FIG. 5, all of the home run hitting scene segments are gathered and can be played sequentially, and all of double base hitting scene segments are gathered and can be played sequentially. Accordingly, the summarized video will contain a much more complete important events than the prior inventions are capable of.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of processing a sports video, comprising the steps of:
   analyzing the sports video to detect at least one semantic event, each of which is associated with a segment length;
   assigning a segment length to the at least one semantic event according to importance of a corresponding event;
   extracting a scene segment associated with the at least one semantic event out of the sports video according to the segment length; and
   generating a summarized video according to the detected at least one semantic event;
      wherein the segment length of each semantic event varies according to importance and weight of each semantic event and varies according to a context analysis result showing the relative importance of each semantic event comparing to its prior and subsequent events throughout the sports video; and the step of extracting the scene segment associated with the at least one semantic event out of the sports video according to the segment length comprises:
         generating the semantic event according to at least one of base bag, score, and out in a score board region.

2. The method of claim 1, wherein step of generating the summarized video according to the detected at least one semantic event comprises generating the summarized video with a desired length by combining the detected at least one semantic event.

3. The method of claim 2, wherein the segment length of each semantic event proportionally varies according to the desired length of the summarized video.

4. The method of claim 1, wherein the segment length of each semantic event is a predetermined semantic length.

5. The method of claim 1, wherein he sports video is a baseball sports video.

6. The method of claim 5, wherein the semantic event is selected from the group consisting of one-base hit, two-base hit, three-base hit, home run hit, base on ball, fielding, or go ahead run.

7. The method of claim 1, wherein the analyzing step comprises the steps of:
determining the scoreboard region of the sports video;
identifying at least one text content in the score board region; and
detecting variation of the text content to obtain the semantic event.

8. The method of claim 1, wherein the analyzing step comprises the steps of:
detecting audio variation of the sports video;
analyzing the audio variation of the sports video; and
determining the semantic event according to the audio variation.

9. The method of claim 8, wherein the step of analyzing the audio variation of the sports video comprises analyzing the audio variation of a sports broadcaster or commentator in the sports video.

10. The method of claim 8, wherein the step of analyzing the audio variation of the sports video comprises analyzing a specific term by a sports broadcaster or commentator in the sports video.

11. A method of processing a baseball game video, comprising the steps of:
detecting a scoreboard region of the baseball game video;
identifying at least one text content in the scoreboard region;
generating at least one semantic event according to the text content in the score board region;
analyzing variation of the text content throughout the baseball game video to determine a segment length of the semantic event;
assigning the segment length to the semantic event according to importance of a corresponding event; and
extracting a scene segment associated with the semantic event out of the sports video according to the segment length;
wherein the segment length of each semantic event varies according to importance and weight of each semantic event and varies according to a context analysis result showing the relative importance of each semantic event comparing to its prior and subsequent events throughout the sports video, and the step of generating the at least one semantic event according to the text content in the score board region comprises generating the semantic event according to at least one of base bag, score, and out in the score board region.

12. The method of claim 11, further comprising the step of:
generating a summarized video according to the semantic event.

13. The method of claim 11, further comprising the step of:
detecting the audio variation throughout the baseball game video to determine the segment length of the semantic event.

14. The method of claim 13, wherein the analyzing step comprises determining a first segment length of a first semantic event is longer than a second segment length of a second semantic event; wherein a first audio measurement that corresponding to the first semantic event is larger than a second audio measurement that corresponding to the second semantic event.

15. The method of claim 13, wherein the analyzing step comprises determining a first segment length of a first semantic event is longer than a second segment length of a second semantic event; wherein a first audio measurement that corresponding to the numbers of specific term shown in the first semantic event is larger than a second audio measurement that corresponding to the numbers of specific term shown in the second semantic event.

16. A processing apparatus, for processing a sports video, comprising:
an analyzing block, for analyzing the sports video to detect at least one semantic event each of which is associated with a segment length;
an operating block, for assigning a segment length to the at least one semantic event according to importance of a corresponding event;
a first processing block, for extracting a scene segment associated with the at least one semantic event out of the sports video according to the segment length; and
a second processing block, coupled to the analyzing device, for generating a summarized video according to the detected at least one semantic event;
wherein the segment length of each semantic event varies according to importance and weight of each semantic event and varies according to a context analysis result showing the relative importance of each semantic event comparing to its prior and subsequent events throughout the sports video, and the first processing block further generates the semantic event further according to at least one of base bag, score, and out in a score board region.

17. The apparatus of claim 16, wherein the second processing block generates the summarized video with a desired length by combining the detected at least one semantic event.

18. The apparatus of claim 17, wherein the segment length of each semantic event proportionally varies according to the desired length of the summarized video.

19. The apparatus of claim 16, wherein the segment length of each semantic event is a predetermined semantic length.

20. The apparatus of claim 16, wherein the segment length of each semantic event varies according to an event type of each semantic event.

21. The apparatus of claim 16, wherein the sports video is a baseball sports video.

22. The apparatus of claim 21, wherein the semantic event is selected from the group of one-base hit, two-base hit, three-base hit, home run hit, base on ball, fielding, or go ahead run.

23. The apparatus of claim 16, wherein the analyzing block comprises:
a first detecting block, for determining the score board region of the sports video;
a second detecting block, coupled to the first detecting block, for identifying at least one text content in the score board region; and
a third detecting block, coupled to the second detecting block, for detecting variation of the text content to obtain the semantic event.

24. The apparatus of claim 16, wherein the analyzing block comprises:
a first detecting block, for detecting audio variation of the sports video;
a processing block, coupled to the first detecting block, for analyzing the audio variation of the sports video; and
a second detecting block, coupled to the processing block, for determining the semantic event according to the audio variation.

25. The apparatus of claim 24, wherein the processing block analyzes the audio variation of a sports broadcaster or commentator in the sports video.

26. The apparatus of claim 24, wherein the processing block analyzes a specific term by a sports broadcaster or commentator in the sports video.

27. A processing apparatus, for processing a baseball game video, comprising:
- a first detecting block, for detecting a score board region of the baseball game video;
- a second detecting block, coupled to the first detecting block, for identifying at least one text content in the scoreboard region;
- a first processing block, coupled to the second detecting block, for generating at least one semantic event according to the text content in the score board region;
- a second processing block, coupled to the first processing block, for analyzing variation of the text content throughout the baseball game video to determine a segment length of the semantic event;
- an operating block, for assigning the segment length to the at least one semantic event according to importance of a corresponding event; and
- a third processing block, for extracting a scene segment associated with the at least one semantic event out of the sports video according to the segment length;
- wherein the segment length of each semantic event varies according to importance and weight of each semantic event and varies according to a context analysis result showing the relative importance of each semantic event comparing to its prior and subsequent events throughout the sports video, and the first processing block generates the semantic event according to at least one of base bag, score, and out in the score board region.

28. The processing apparatus of claim 27, further comprising:
- a fourth processing block, coupled to the second processing block, for generating a summarized video according to the semantic event.

29. The processing apparatus of claim 27, further comprising:
- a third detecting block, for detecting the audio variation throughout the baseball game video to determine the segment length of the semantic event.

30. The processing apparatus of claim 29, wherein the third detecting block determines that a first segment length of a first semantic event is longer than a second segment length of a second semantic event if a first audio measurement that corresponding to the first semantic event is larger than a second audio measurement that corresponding to the second semantic event.

* * * * *